United States Patent [19]
Hamauchi

[11] Patent Number: 5,463,760
[45] Date of Patent: Oct. 31, 1995

[54] BREAK FUNCTION IN-CIRCUIT EMULATOR FOR A MICROPROCESSOR WITH A CACHE MEMORY

[75] Inventor: Tetsuji Hamauchi, Tokyo, Japan

[73] Assignee: NEC Corporation, Tokyo, Japan

[21] Appl. No.: 756,199

[22] Filed: Sep. 9, 1991

[30] Foreign Application Priority Data

Sep. 7, 1990 [JP] Japan .................................. 2-237417

[51] Int. Cl.⁶ ........................................................ G06F 11/00
[52] U.S. Cl. .......................... 395/500; 375/800; 375/375; 375/183.04; 364/232.8; 364/266; 364/DIG. 1
[58] Field of Search ........................ 395/375, 500, 395/700, 800, 425; 371/16, 16.2, 2.2, 3, 15.1, 16.1, 16.2, 16.5, 21.6, 22.1, 22.6, 23, 67.1, 68.3

[56] References Cited

U.S. PATENT DOCUMENTS

| | | | |
|---|---|---|---|
| 4,674,089 | 6/1987 | Poret et al. | 371/25 |
| 4,811,345 | 3/1989 | Johnson | 371/16 |
| 4,924,382 | 5/1990 | Shouda | 395/700 |
| 4,998,197 | 3/1991 | Kurakazu et al. | 395/800 |
| 5,053,949 | 10/1991 | Allison et al. | 345/375 |
| 5,132,971 | 7/1992 | Oguma et al. | 371/16.2 |

Primary Examiner—Alyssa H. Bowler
Assistant Examiner—Alpesh M. Shah
Attorney, Agent, or Firm—Whitham, Curtis, Whitham & McGinn

[57] ABSTRACT

An in-circuit emulator comprising a microprocessor having an input terminal for selecting whether or not the data obtained by accessing an external address should be registered in the cache memory, a register for storing an address for discontinuing the execution of the microprocessor, and a comparator for comparing an address outputted from the microprocessor with the address stored in the register. When the result of comparison is indicative of coincidence, the comparator outputs a coincidence output signal to the above mentioned terminal of the microprocessor, so that the data is inhibited from being registered into the cache memory. Therefore, an external access is performed for the address discontinuing the execution, and accordingly, a break address can be detected by a device external to the microprocessor.

5 Claims, 8 Drawing Sheets

BREAK FUNCTION IN-CIRCUIT
EMULATOR FOR A MICROPROCESSOR
WITH A CACHE MEMORY

BACKGROUND OF THE INVENTION

1. Field of the Invention

The present invention relates to an in-circuit emulator, and more specifically to an in-circuit emulator for use in a microprocessor including a cache memory therein.

2. Description of Related Art

An in-circuit emulator simulating an operation of a microprocessor has a function called a "break function" for discontinuing the execution at an arbitrary position of a program. The break function has been realized by comparing an address or another signal outputted from the microprocessor with a value previously set in a register provided externally to the microprocessor, and by interrupting the microprocessor so as to request discontinuation of the execution when the result of comparison is indicative of coincidence.

In addition, some conventional microprocessors include therein a cache memory, which is located between the microprocessor and an external memory and which has an accesses speed remarkably higher than that of the external memory. When the microprocessor access the external memory, data on an address of the external memory accessed by the microprocessor is copied to the cache memory, so that at a next access by the microprocessor, if the data required by the microprocessor exists in the cache memory, the microprocessor accesses to the cache memory, but does not access to the external memory. Therefore, performance is elevated by the difference in the access speed between the external memory and the cache memory. Accordingly, the cache memory is provided in the microprocessor with expectation of a great increase of performance.

In the case that a 32-bit microprocessor having an address of 32 bits and a data of 32 bits and including the cache memory therein is used in the in-circuit emulator, assume that an address "$11001209_H$" (suffix "H" indicates a hexadecimal notation) is set as a break address, and also assume that one block, which is a minimum unit of data stored in the cache memory, is 16 bytes. In this situation, when the microprocessor accesses an address "$11001200_H$", if data of the address "$11001200_H$" is not registered in the cache memory, the microprocessor accesses the external memory. Therefore, one block of data is block-transferred from the external memory to the cache memory in four continuous cycles. In this process, one word of data accessed in a first cycle is not only stored in the cache memory but also used internally in the microprocessor. However, words of data accessed in the remaining three cycles are only stored in the cache memory.

In this situation, the conventional in-circuit emulator has been disadvantageous in which, an interrupt request which should have been generated at an address "$11001209_H$" in a third cycle of the four continuous cycles is not generated, and therefore, the execution of the microprocessor is not interrupted. In addition, thereafter, even if the access to the address "$11001209_H$" is generated, the microprocessor accesses to the cache memory, and therefore, the address "$11001209_H$" is not outputted from the microprocessor. Accordingly, the microprocessor is not interrupted.

As seen from the above, when the access of the microprocessor hits on the cache memory, namely, when the data to be accessed is registered in the cache memory internally provided in the microprocessor, no external access is performed. Namely, no address signal is outputted externally from the microprocessor. Therefore, a break address cannot be detected external of the microprocessor. Because of this, it has been a conventional practice to invalidate all of the cache memory so that access is made to an external device without exception, and therefore, the break address can be detected externally. In this case, however, since no access to the cache memory is performed, the execution time becomes considerably or remarkably long in comparison with the case in which the cache memory is effectively utilized. In other words, a real time operation is lost.

SUMMARY OF THE INVENTION

Accordingly, it is an object of the present invention to provide an in-circuit emulator which has overcome the above mentioned defect of the conventional one.

Another object of the present invention is to provide an in-circuit emulator configured to inhibit registration into a cache memory of data of an address discontinuing the execution, so that an external access is performed for the address discontinuing the execution, and therefore, a break address can be detected by a device external to the microprocessor.

The above and other objects of the present invention are achieved in accordance with the present invention by an in-circuit emulator comprising a microprocessor having an input terminal for selecting whether or not the data obtained by accessing an external address should be registered in the cache memory, a register for storing an address for discontinuing the execution of the microprocessor, and a comparator for comparing an address outputted from the microprocessor with the address stored in the register and for generating, when coincidence is obtained, a coincidence output signal to the above mentioned terminal of the microprocessor, so that the data is inhibited from being registered into the cache memory.

The above and other objects, features and advantages of the present invention will be apparent from the following description of preferred embodiments of the invention with reference to the accompanying drawings.

DESCRIPTION OF THE PREFERRED EMBODIMENTS

Figure 1:
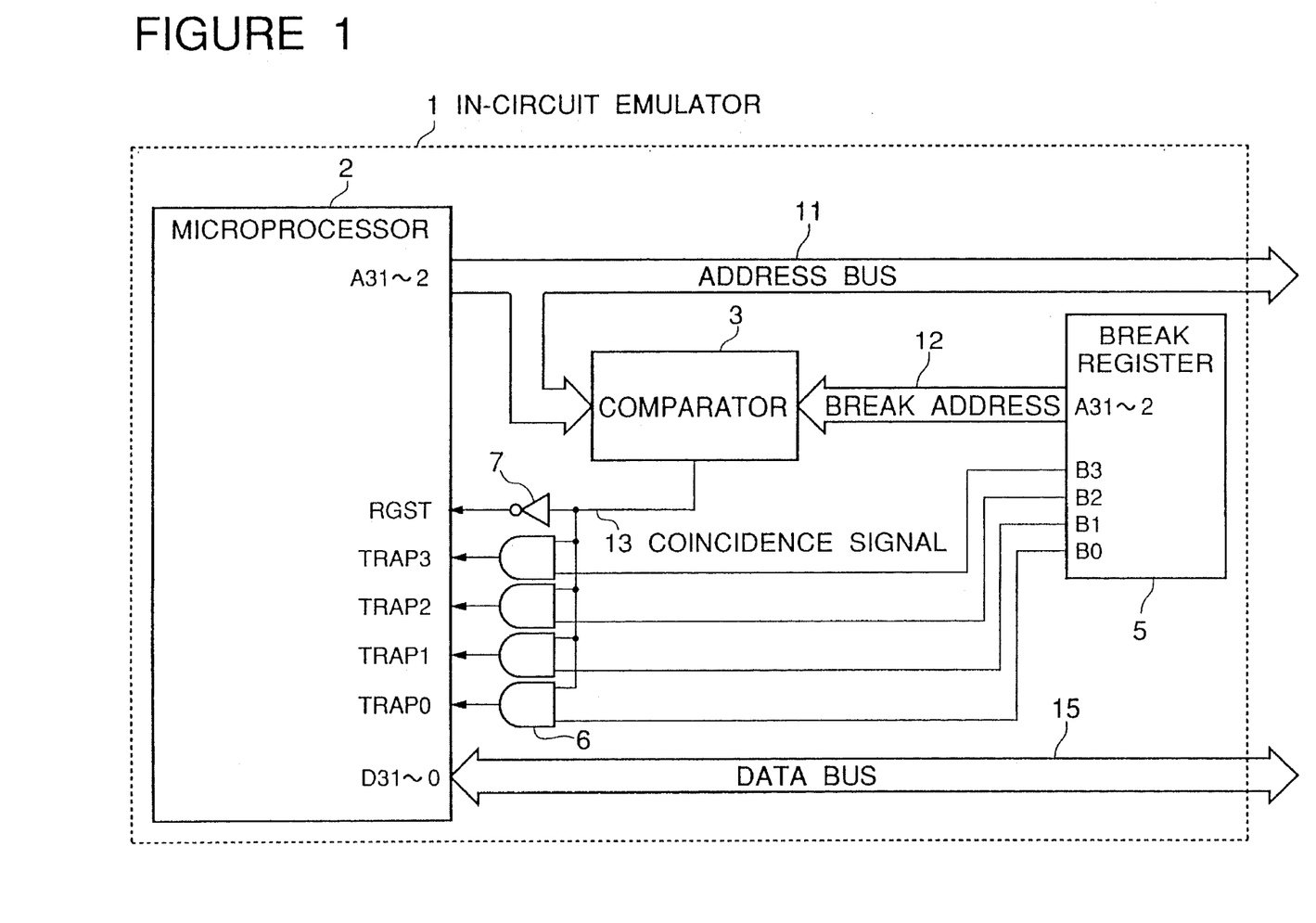
FIG. 1 is a block diagram of a first embodiment of the in-circuit emulator in accordance with the present invention.

Referring to FIG. 1, there is shown a block diagram of a first embodiment of the in-circuit emulator in accordance with the present invention.

An in-circuit emulator, generally designated by Reference Numeral 1, includes a 32-bit microprocessor having an address port for A31–A2 (A31 is the most significant address bit) coupled to an address bus 11 and a data port for D31–D0 (D31 is the most significant data bit and D0 is the least significant data bit) coupled to a data bus 15. There is also provided a break register 5 storing a break address for discontinuing execution of the microprocessor 2 so as to generate an interrupt. This break register 5 outputs a break address 12 of A31–2 and four designation signals B3–B0 for designating at which of bytes in a word the interrupt should be generated. This break register 5 is previously set with a break address before the microprocessor starts execution. For example, if the execution should be interrupted at an access to the address "$11001209_H$" (suffix "H" shows a hexadecimal notation), "$11001208_H$" is set in the break register 5 as the break address, and "0", "0", "1" and "0" are set as the four designation signals B3–0, respectively.

A comparator 3 compares the address 11 outputted from the microprocessor 2 with the break address 12 set in the break register 5, and outputs a coincidence signal 13 of a high level when the address 11 is coincident with the break address 12. This coincidence signal 13 is supplied to one input of each of four AND gates 6, each of which has the other input connected to receive a corresponding one of the four designation signals B3–B0. Outputs of the four AND gates 6 are connected to four interrupt input terminals TRAP3, TRAP2, TRAP1 and TRAP0 of the microprocessor 2. For example, the interrupt input terminal TRAP0 is an interrupt input corresponding to data accessed through data lines D7 to D0 of the data bus 15. The other interrupt input terminals are to be understood in a similar manner. If the interrupt request is inputted in an instruction fetch cycle, the interrupt is generated after the execution of the instruction. If the interrupt request is inputted in a data acess cycle, the interrupt is generated after the instruction being under execution has been executed.

Furthermore, the coincidence signal 13 is also supplied to an inverter 7 and an inverted signal of the coincidence signal 13 is inputted to a cache memory registration request terminal RGST of the microprocessor 2. This cache memory registration request terminal RGST is provided for requesting to register data accessed by the microprocessor 2 into a cache memory (not shown in FIG. 1) internally provided in the microprocessor 2. If the cache memory registration request terminal RGST is at a high level, the data is registered in the cache memory. On the other hand, if the cache memory registration request terminal RGST is at a low level, all data in a block is not registered.

As mentioned above, when the address 11 outputted from the microprocessor 2 is coincident with the break address 12 of the break register 5, the comparator 3 outputs a coincidence signal 13 of a high level. However, this coincidence signal 13 of a high level is inverted by the inverter 7, and a low level signal is inputted to the cache memory registration request terminal RGST of the microprocessor 2. Therefore, in a cycle in which an address of discontinuing the execution is accessed, even if a corresponding interrupt input TRAP is brought into a high level, the cache memory registration request terminal RGST is brought into a low level. Therefore, the accessed data is not registered in the cache memory.

On the other hand, if the coincidence signal 13 of a high level is not outputted from the comparator 3, namely, the coincidence signal 13 is at a low level which means that the break address is not outputted from the microprocessor 2, if the data access is made to the external memory, the data is registered into the cache memory.

Figure 2:
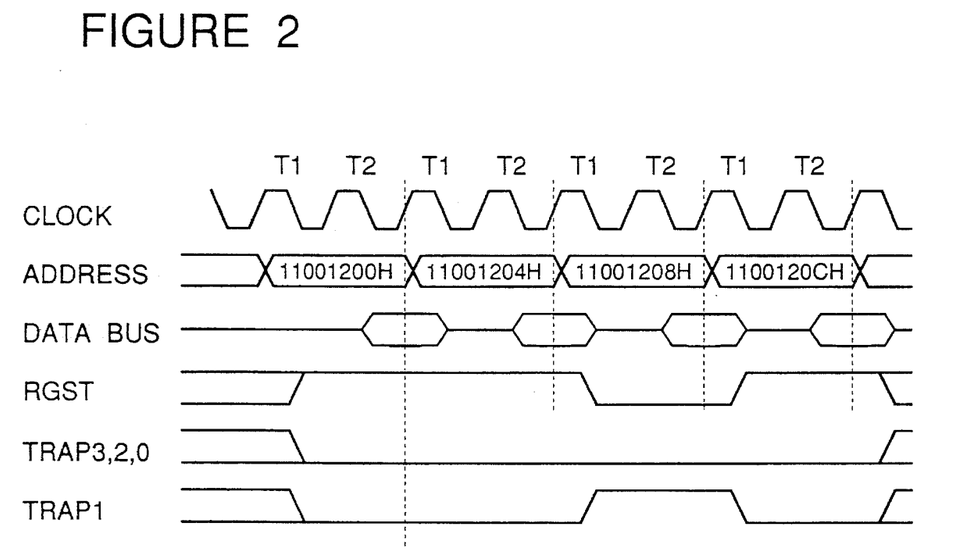
FIGS. 2 and 3 are timing charts illustrating an operation of the first embodiment shown in FIG. 1.

Referring to FIG. 2, there is shown a timing chart of continuously accessing one block of 16 bytes (which is a minimum unit to be registered in the cache memory) when an access is made to an address "$11001200_H$". In FIG. 2 and in the following figures, the character "H" added to an end of a numeral string means a hexadecimal notation. Assume that an address "$11001209_H$" is set in the break register 5. At a rising of a clock next to a first T2 cycle, a first one word of data of one block and the interrupt inputs TRAP3 to TRAP0 are sampled. In succeeding cycles, three words of data are continuously accessed. In the third cycle, the low level of the cache memory registration request RGST is sampled. Therefore, all data of one block accessed is not registered in the cache memory, and only one word of data accessed in the first cycle is used and the data accessed in the other cycles are disposed.

Figure 3:
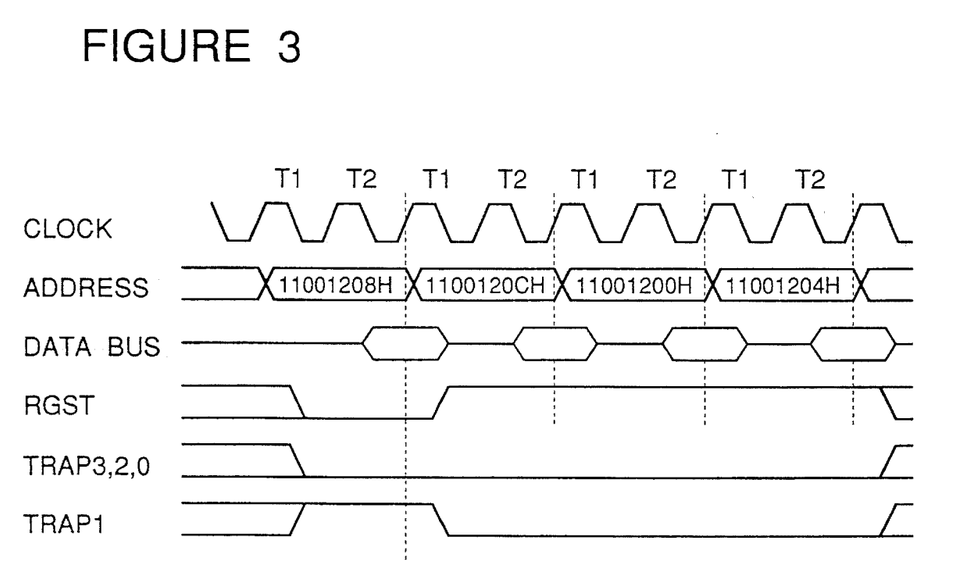

Referring to FIG. 3, there is shown a timing chart of the case of fetching, as an effective data, data of the break address "$11001209_H$". In this transfer cycle, one word starting from the address "$11001208_H$" is first accessed, and then, words starting from the addresses "$1100120C_H$", "$11001200_H$" and "$11001204_H$", respectively, are succeedingly accessed in the named order, so that data of one block is accessed. Similarly to the case shown in FIG. 2, since the cache memory registration request RGST is brought into a low level by the address outputted in the first T1 cycle, the data of the address outputted in the first cycle is not registered in the cache memory. However, since the high level of the interrupt input TRAP1 is sampled at an end of the T2 cycle, if it is the data accessed or if the data has been executed as an instruction, an interrupt is generated and the execution is discontinued.

Figure 4:
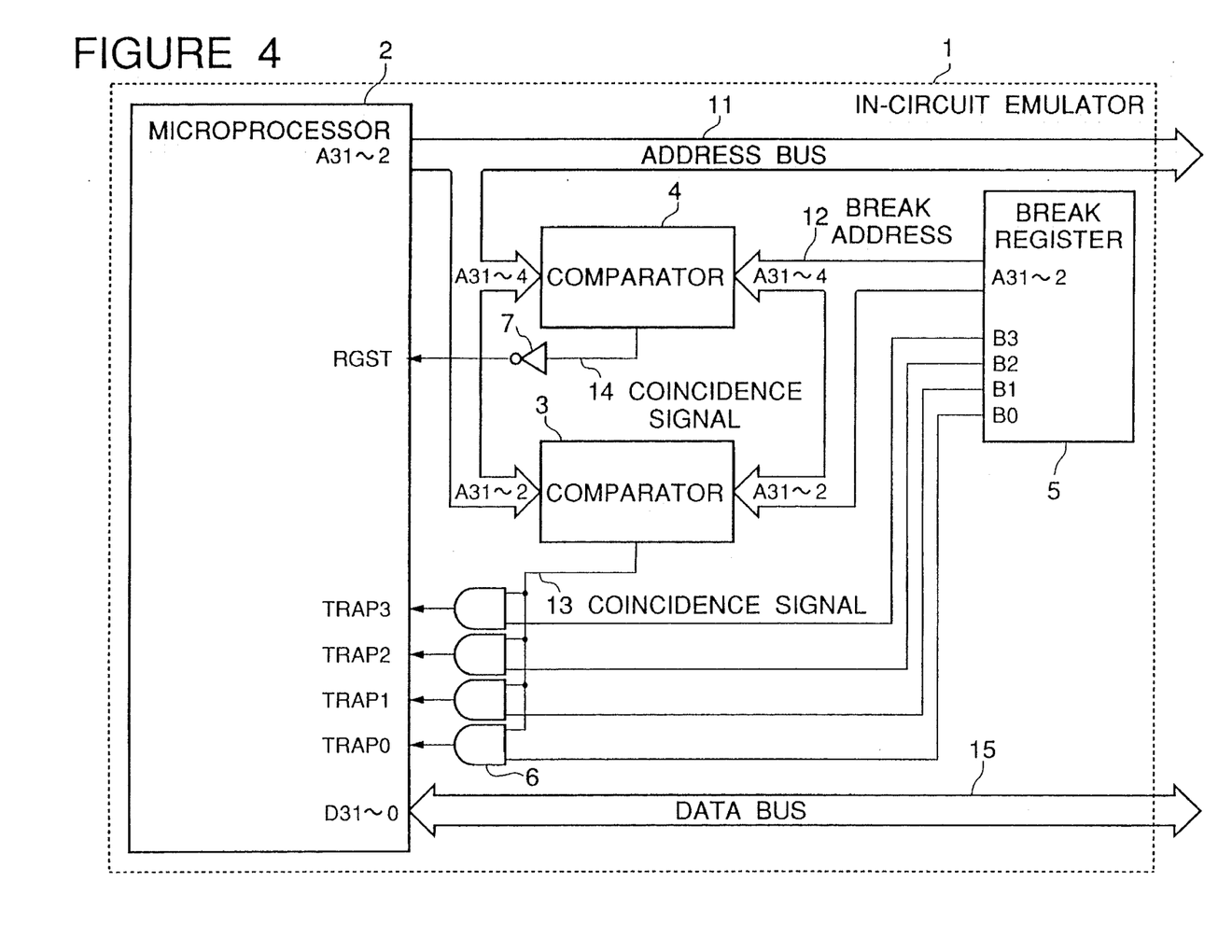
FIG. 4 is a block diagram of a second embodiment of the in-circuit emulator in accordance with the present invention.

Referring to FIG. 4, there is shown a block diagram of a second embodiment of the in-circuit emulator in accordance with the present invention. In FIG. 4, elements similar to those shown in FIG. 1 are given the same Reference Numerals, and therefore, explanation thereof will be omitted for simplification of description.

As seen from comparison between FIGS. 1 and 4, the second embodiment includes an additional comparator 4 which compares address bits A31–A4 of the address 11 of the microprocessor 2 with address bits A31–A4 of the break address 12 of the break register 5, and generates a coincidence signal 14 of a high level to the inverter 7 when the address bits A31–A4 of the microprocessor address 11 is coincident with address bits A31–A4 of the break address 12. The output of the inverter 7 is connected to the cache memory registration request terminal RGST of the microprocessor 2, similarly to the first embodiment.

Figure 5:
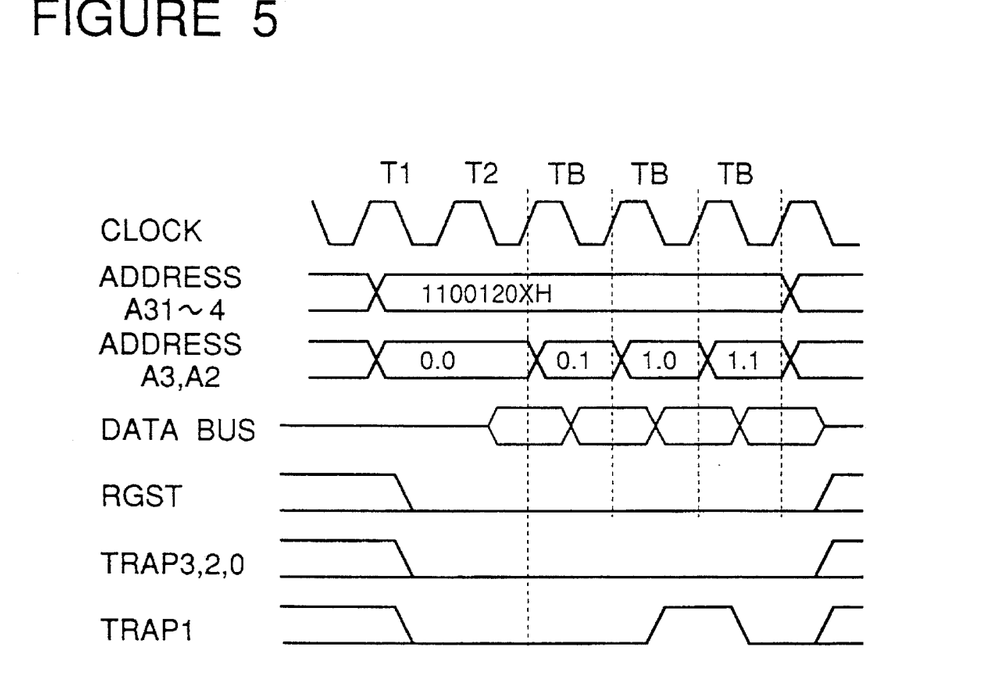
FIGS. 5 and 6 are timing charts illustrating an operation of the second embodiment shown in FIG. 4.
Figure 6:
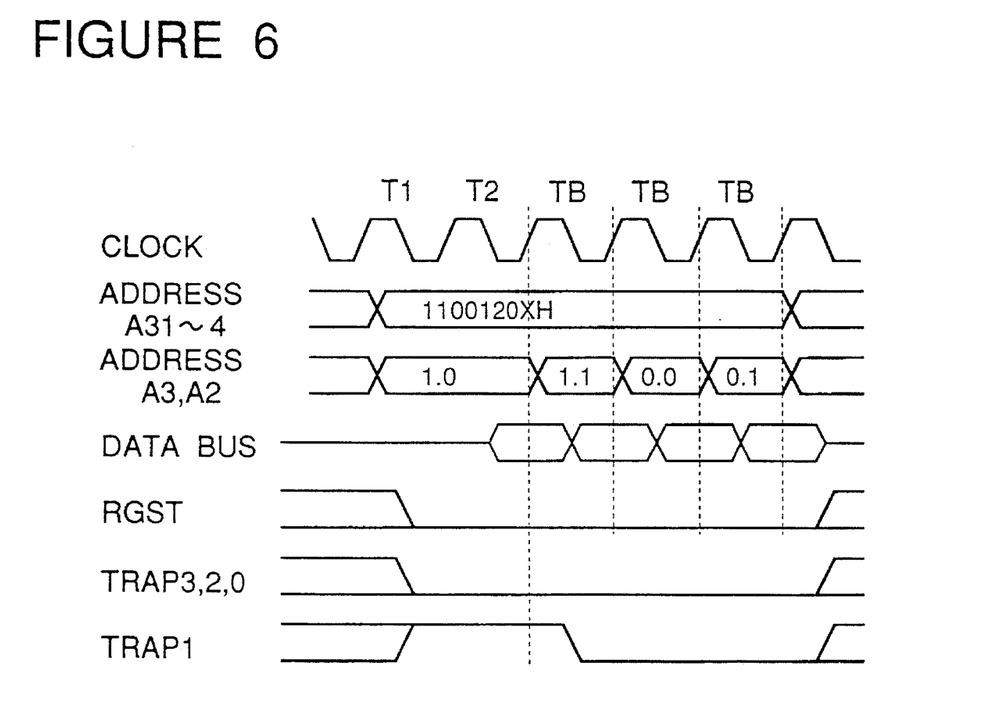

Some microprocessors including a cache memory therein have a transfer cycle called a "burst transfer" for quickening an access to an external memory. FIGS. 5 and 6 illustrate a timing chart of the burst transfer operation of the in-circuit emulator shown in FIG. 4. An address is outputted in the T1 cycle, and at a rising of a clock next to the T2 cycle, a first one word of data of one block and the interrupt request inputs TRAP3 to TRAP0 are sampled. In each of succeeding TB cycles, the address is incremented, so that three words of data are continuously accessed. In the burst transfer, the cache memory registration request input RGST is sampled at an end of the T2 cycle and at an end of each TB cycle. If the cache memory registration request input RGST is at a low level, data of the block accessed is not registered in the cache memory, and only the data accessed in the T2 cycle in the burst transfer cycle becomes effective.

FIG. 5 shows a cycle in which one block of data (16 bytes) is transferred from the address "$11001200_H$" in the burst transfer mode. The break register 5 is previously registered with "$11001209_H$" as the break address. In the T1 cycle, the address bits A31 to A4 of the address 11 outputted from the microprocessor 5 are coincident with the address bits A31 to A4 of the break address 12, and therefore, a low level signal is inputted to the cache memory registration request terminal RGST. Accordingly, this block of data at addresses including the break address "$11001209_H$" is not registered in the cache memory.

Referring to FIG. 6, there is shown a cycle in which the data of the break address "$11001209_H$" is fetched as an effective data. In this burst transfer cycle, one word starting from the address "$11001208_H$" is first accessed, and then, words starting from the addresses "$1100120C_H$", "$11001200_H$" and "$11001204_H$", respectively, are succeedingly accessed in the named order, so that data of one block is accessed. Similarly to the case shown in FIG. 5, since the cache memory registration request RGST is brought into a low level by the address outputted in the first T1 cycle, the data of the address outputted in the first cycle is not registered in the cache memory. However, since the high level of the interrupt input TRAP1 is sampled at an end of the T2 cycle, if it is the data accessed or if the data has been executed as an instruction, an interrupt is generated and the execution is discontinued.

In the examples shown in FIGS. 4 to 6, since a time from change of the address bits A3 and A2 until the sampling of the cache memory registration request RGST is not greater than one clock, the comparators are required to operate at a high speed. However, since the comparator 4 in this embodiment makes comparison in only the address bits A31 to A4, a margin time can be afforded after the address is outputted at the T1 cycle until the end of the T2 cycle where the interrupt input TRAP1 is sampled, so that the interrupt input TRAP1 can be maintained at a low level in the T2 and TB cycles.

As seen from the above, the in-circuit emulator in accordance with the present invention comprises a microprocessor having an input terminal for selecting whether or not the data obtained by accessing an external address should be registered in the cache memory, a register for storing an address for discontinuing the execution of the microprocessor, and a comparator for comparing an address outputted from the microprocessor with the address stored in the register and for generating, when coincidence is obtained, a coincidence output signal to the above mentioned terminal of the microprocessor. With this arrangement, the data of the address discontinuing the execution is inhibited from being registered into the cache memory, so that an external access is performed for the address discontinuing the execution, and therefore, a break address can be detected by a device external to the microprocessor.

In the above mentioned arrangement, all of the cache memory is not invalidated, and the cache memory is accessed for data other than blocks including an address discontinuing the execution. An operation near to a real time can be realized.

Figure 7:
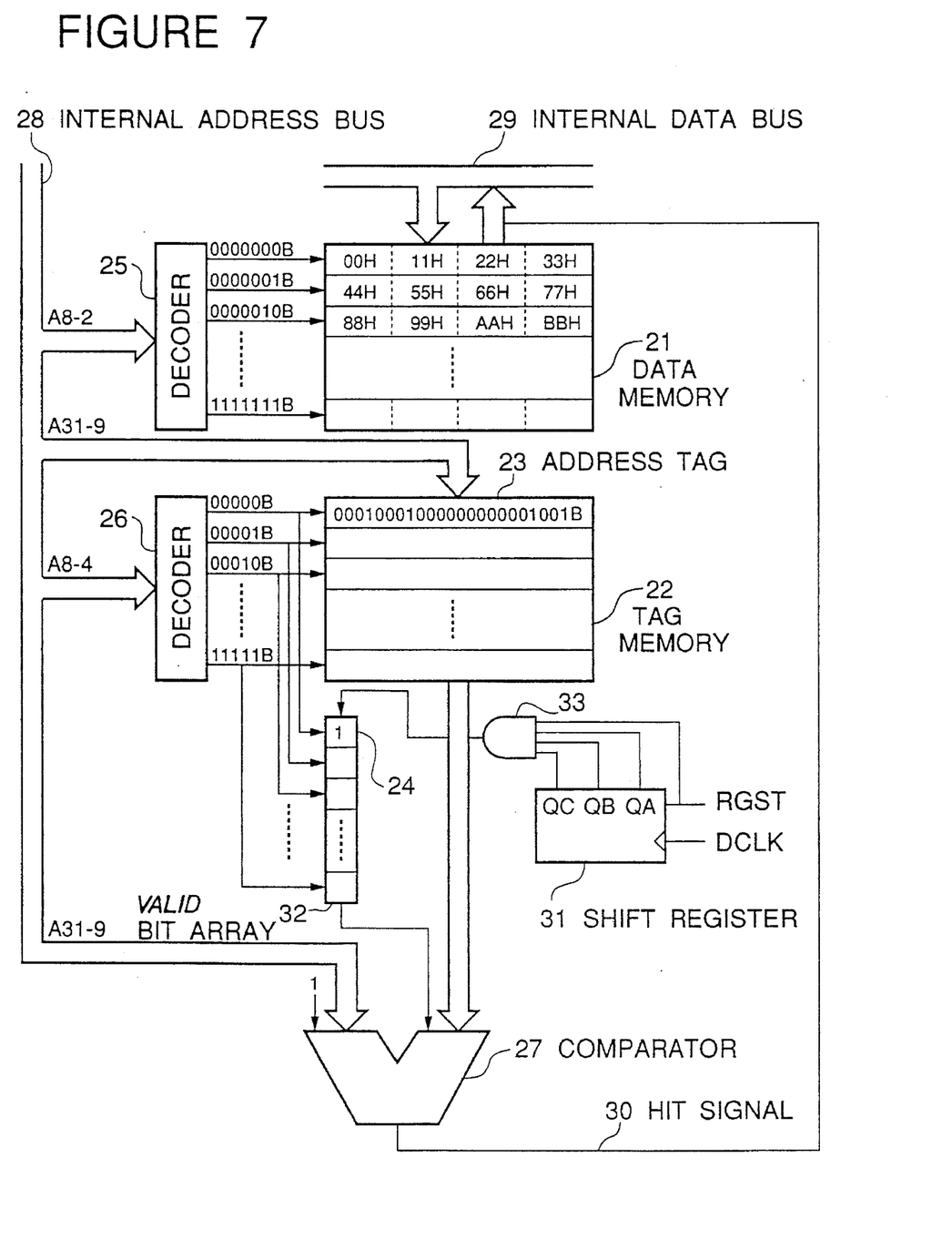
FIG. 7 is a block diagram of the cache memory internally provided in the microprocessor of the in-circuit emulator shown in FIG. 1.

Referring to FIG. 7, there is shown a block diagram of the cache memory internally provided in the microprocessor 2 of the in-circuit emulator 1. In FIG. 7 and in the following figures, the character "B" added to an end of numerical string means a binary notation.

The cache memory includes a data memory 21 for storing the same data as that of an external memory, and a tag memory 22 for storing an address tag 23 which is an address in the external memory of each data stored in the data memory 21. An address of the data memory is selected by an address decoder 25 which receives address bits A8 to A2 on an internal address bus 28 composed of address bits A32 to A2, and the data memory 21 is coupled to an internal data bus 29 for sending or receiving data from the internal data bus 29.

The cache memory also includes a parity bit array 32 (e.g., a valid bit array) to store, as a parity bit, "1" when a corresponding data of the data memory 21 and a corresponding address tag of the tag memory 22 are both effective. If a corresponding data of the data memory 21 and a corresponding address tag of the tag memory 22 are invalid, the parity bit array 32 stores "0" as the parity bit. The parity bit array 32 is written by an output of an four-input AND gate 33, which has a first input connected to receive the cache memory registration request RGST. Second to fourth inputs of the four-input AND gate 33 are connected to three parallel outputs of a 3-bit shift register 31 receiving the cache memory registration request RGST at its serial input. The shift register 31 is shifted by a clock DCLK which defines a timing for writing the data on the internal data bus 29 into the data memory 21.

In this shown example, the tag memory has a width of 23 bits and 32 entries. Therefore, address bits A31 to A9 on the internal address bus 28 are coupled to the tag memory 22. In addition, address bits A8 to A4 on the internal address bus 28 are supplied to a decoder 26, which operates to select one address tag in the tag memory 22. The value of the selected address tag 23 is compared with the address bits A31 to A9 on the internal address bus 28 by a comparator 27. When the result of comparison is indicative of coincidence, if a corresponding parity bit is 24 is "1", the comparator 27 activates a hit signal 30, so that data is read out from the data memory.

Figure 8:
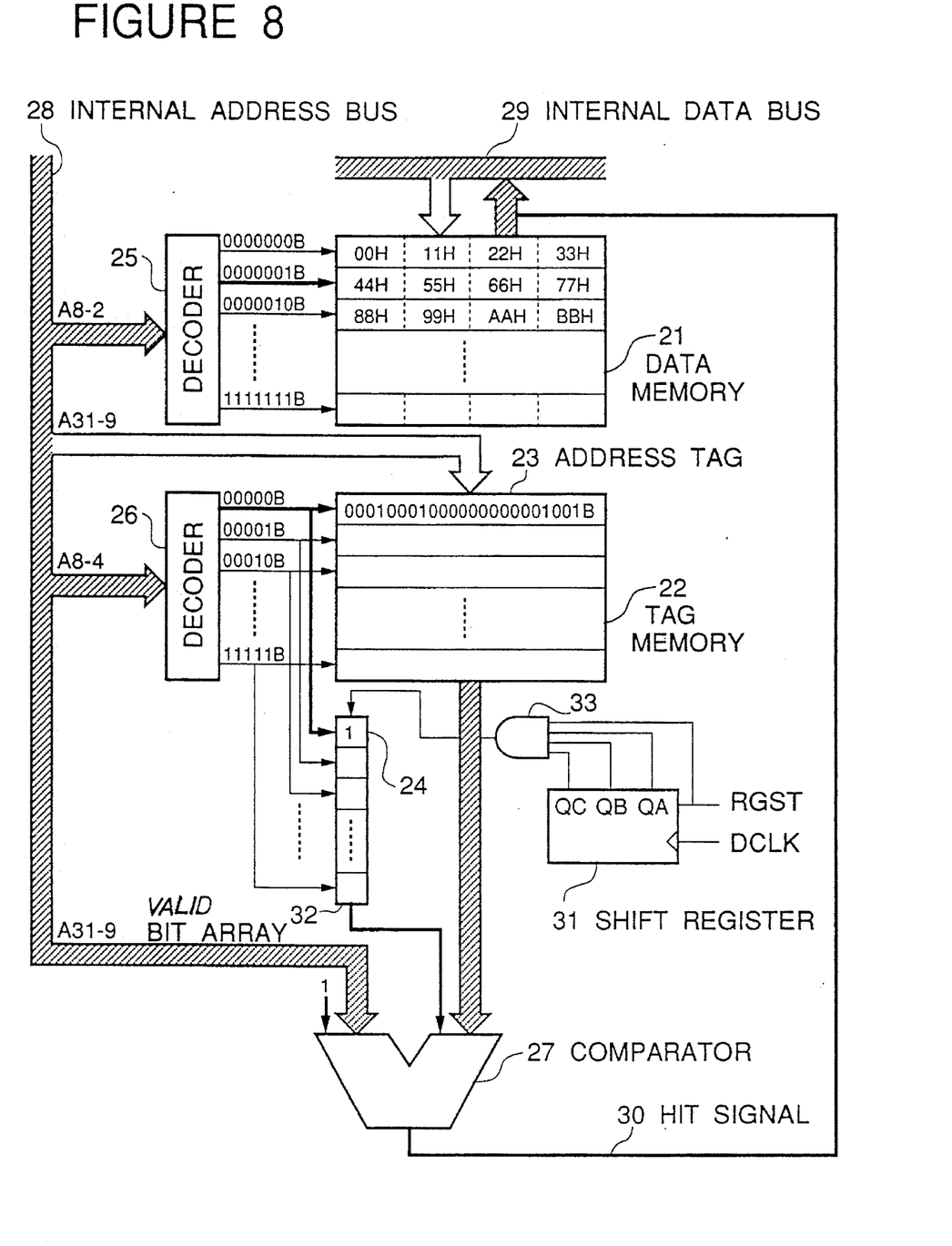
FIG. 8 is a diagram similar to FIG. 7, but illustrating an operation in which the microprocessor accesses a word of data from an address "$11001204_H$"

FIG. 8 shows a condition in which four words starting an address "$11001200_H$" of the external memory is registered in the cache memory. In FIG. 8, effective signal flows are indicated by hatching or thickened solid lines. In this condition, the case in which the microprocessor accesses a word of data at the address "$11001204_H$" is illustrated in FIG. 8. In this case, the address bits A8 to A4 on the internal address bus 28 are "$00000_B$" (the suffix "B" means a binary notation), and therefore, the address tag "$00010001000000000001001_B$" is read out from the tag memory 22. "$00010001000000000001001_B$" is supplied to the comparator 27 together with the parity bit "1" which is simultaneously read out, and then, is compared with the address bits A32 to A9 on the internal address bus 28 and an additional bit of "1" corresponding to the parity bit. Since a coincidence result is obtained, the hit signal 30 is activated, so that the address bits A8 to A2 on the internal address bus 28 is decoded by the decoder 25 and an address "$0000001_B$" of the data memory 21 is selected. Accordingly, the data "$44556677_H$" is read from the data memory 21 to the internal data bus 29.

Figure 9:
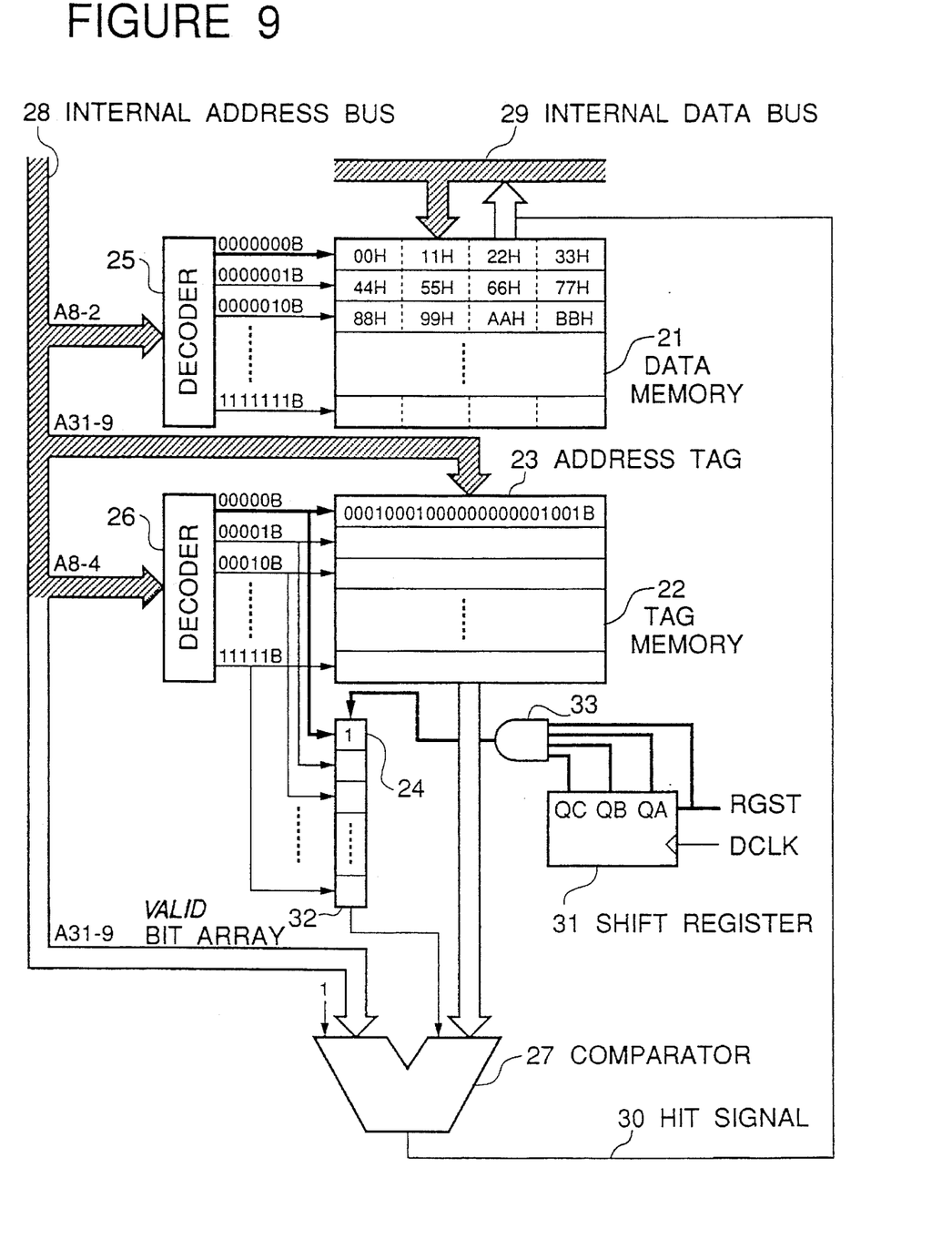
FIG. 9 is a diagram similar to FIG. 7, but illustrating an operation of registering data of one block (16 bytes) from an address "$11001200_H$" of the external memory, into the cache memory.
Figure 10:
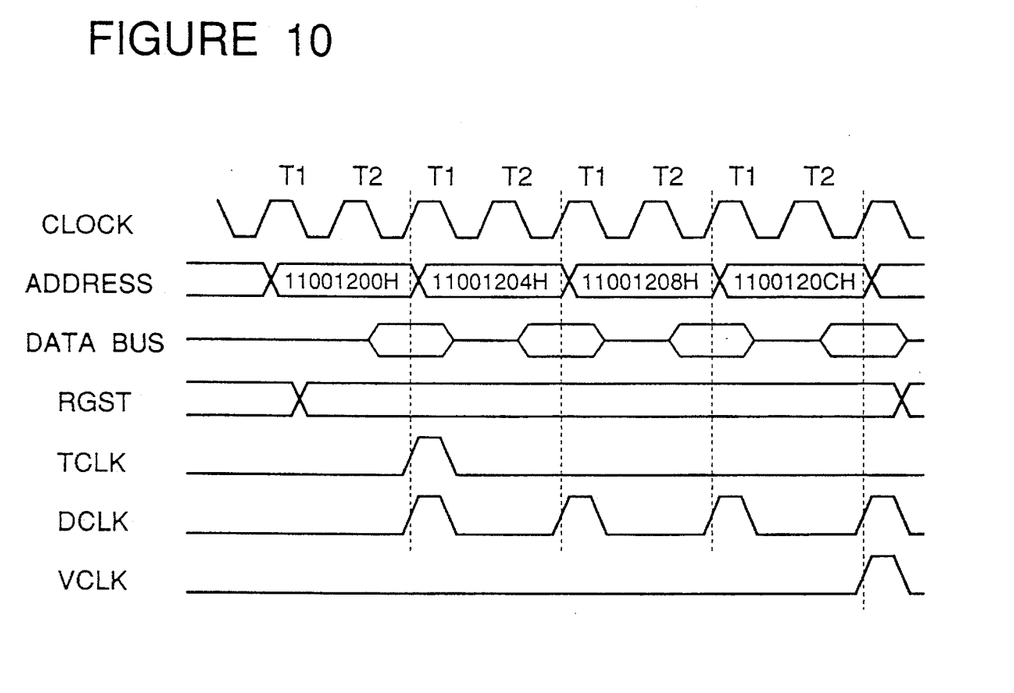
FIG. 10 is a timing chart of illustrating the operation shown in FIG. 9.

Referring to FIG. 9, there is shown a diagram similar to FIG. 7, but illustrating an operation of registering data of one block (16 bytes) from an address "$11001200_H$" of the external memory, into the cache memory. In FIG. 9, effective signal flows are indicated by hatching or thickened solid lines. In addition, FIG. 10 is a timing chart illustrating the operation shown in FIG. 9. In FIG. 10, a clock TCLK is a timing signal for writing the address bits A31 to A9 on the internal address bus 28 into the tag memory 22, and as mentioned above, the clock DCLK is the timing signal for writing the data on the internal data bus 29 into the data memory 21. A clock VCLK is a timing signal for writing the parity bit 24 into the parity bit array 32. The three writings are executed at a rising of the corresponding clock signal.

In the cycle for writing the cache memory, a first word of data is written from the internal data bus 29 into the data memory 21 at the rising of the clock DCLK. At the same time, the address bits A31 to A9 on the internal address bus 28 are written to the address tag 23 of the tag memory 22 at the rising of the clock TCLK. In three succeeding write cycles, the remaining three words of data are written into the data memory 21 at the rising of the clock DCLK. At the same timing, the value of the cache memory registration request RGST is sequentially inputted and shifted to the shift register 31. If the cache memory registration request RGST is maintained at a high level during all the four write cycles, the parity bit "1" is inputted to the parity bit array 32 from the AND gate 33. This parity bit "1" is written as the parity bit 24 into the parity bit array 32 at the rising of the clock VCLK appearing at the end of the fourth write cycle.

Therefore, in the case of accessing the address "11001200" described hereinbefore in connection with FIG. 2, if the cache memory registration request RGST becomes "0" in the third access cycle, the AND gate 33 outputs "0", and therefore, "0" is written as the parity bit. Accordingly, the content written into the data memory has no meaning. This is equivalent to the fact that the data of the accessed block is not registered in the cache memory.

The invention has thus been shown and described with reference to the specific embodiments. However, it should be noted that the present invention is in no way limited to the details of the illustrated structures but changes and modifications may be made within the scope of the appended claims.

I claim:

1. An in-circuit emulator comprising:

a microprocessor including an address port, a data port, a cache memory, a plurality of interrupt request terminals, and a cache memory registration request input terminal for selecting whether or not the data obtained by accessing an external address should be registered in the cache memory, an address bus and a data bus respectively connected to said address port and said data port of said microprocessor, said microprocessor outputting an address on said address bus but for accessing data on said data bus from an external device, a break register for storing an address for discontinuing the execution of the microprocessor, said break register outputting a plurality of interrupt request signals based on predetermined segments of data on said data bus, a plurality of logic gates operatively coupled to said break register to receive respective ones of said plurality of interrupt request signals therefrom and operatively connected to respective ones of said plurality of interrupt request terminals for providing outputs to said respective ones of said interrupt request terminals of said microprocessor, and comparator means connected to said address bus and said break register for comparing an address outputted on said address bus from the microprocessor with the address stored in the break register and for generating, when coincidence is obtained, a coincidence output signal to the cache memory registration request input terminal of the microprocessor and said plurality of logic gates, so that the data on said data bus is inhibited from being registered into the cache memory.

2. An in-circuit emulator claimed in claim 1 wherein the plurality of logic gates comprise AND gates and the logic gates are opened by the coincidence output signal.

3. An in-circuit emulator claimed in claim 2 further comprising an inverter and wherein the coincidence output signal is supplied through said inverter to the cache memory registration request input terminal of the microprocessor.

4. An in-circuit emulator claimed in claim 1 further comprising an inverter and wherein the coincidence output signal of the comparator means is supplied through said inverter to the cache memory registration request input terminal of the microprocessor.

5. An in-circuit emulator claimed in claim 4 wherein said comparator means comprises first and second comparators, both of which compare the address outputted on the address bus from the microprocessor with the address stored in the break register and for respectively generating, when coincidence is obtained, first and second coincidence output signals, the first coincidence output signal being applied to the cache memory registration request input terminal of the microprocessor and said logic gates being opened by the second coincidence output signal.

* * * * *